United States Patent [19]
Boyd et al.

[11] Patent Number: 5,343,544
[45] Date of Patent: Aug. 30, 1994

[54] INTEGRATED OPTICAL FIBER COUPLER AND METHOD OF MAKING SAME

[75] Inventors: Gary T. Boyd; Tzu-Chen Lee, both of Woodbury; Bruce A. Sventek; Elisa M. Cross, both of St. Paul; Laura A. Weller-Brophy, White Bear Township, Ramsey County, all of Minn.

[73] Assignee: Minnesota Mining and Manufacturing Company, St. Paul, Minn.

[21] Appl. No.: 87,503

[22] Filed: Jul. 2, 1993

[51] Int. Cl.⁵ .................. G02B 6/30; B29D 11/00
[52] U.S. Cl. ............................ 385/46; 385/14; 385/45; 385/49; 385/51; 385/131; 385/132; 264/1.1; 264/1.7; 264/1.25
[58] Field of Search .............. 385/14, 45, 46, 49, 385/51, 88, 89, 83, 129, 130, 131, 132; 264/1.1, 1.4, 1.5, 1.6, 1.7, 2.5, 2.7

[56] References Cited

U.S. PATENT DOCUMENTS

| | | | |
|---|---|---|---|
| 3,767,445 | 10/1973 | Chandross et al. | 117/8 |
| 4,384,038 | 5/1983 | Khoe et al. | 385/14 X |
| 4,750,800 | 6/1988 | Fournier et al. | 385/14 X |
| 4,878,728 | 11/1989 | Mannschke | 385/14 X |
| 4,885,332 | 12/1989 | Bilkadi | 524/714 |
| 4,896,930 | 1/1990 | Tsuchitani et al. | 350/96 |
| 4,968,116 | 11/1990 | Hulme-Lowe et al. | 350/96 |
| 4,995,686 | 2/1991 | Blonder | 350/96 |
| 5,015,059 | 5/1991 | Booth et al. | 385/49 X |
| 5,046,800 | 9/1991 | Blyler et al. | 385/131 |
| 5,046,808 | 9/1991 | Chang | 385/14 X |
| 5,054,872 | 10/1991 | Fan et al. | 385/130 |
| 5,062,680 | 11/1991 | Imamura et al. | 385/131 |
| 5,074,630 | 12/1991 | Rodino et al. | 385/14 |
| 5,080,458 | 1/1992 | Hockaday | 385/49 X |
| 5,106,211 | 4/1992 | Chiang et al. | 385/132 |
| 5,109,448 | 4/1992 | Coden et al. | 385/46 |
| 5,123,068 | 6/1992 | Hakoun et al. | 385/14 |
| 5,136,678 | 8/1992 | Yoshimura | 385/132 |
| 5,150,440 | 9/1992 | Booth | 385/49 |
| 5,175,781 | 12/1992 | Hockaday et al. | 385/49 |
| 5,185,824 | 2/1993 | Grimes et al. | 385/19 |
| 5,201,018 | 4/1993 | Coden et al. | 385/88 |
| 5,218,663 | 6/1993 | Isono et al. | 385/129 |
| 5,230,990 | 7/1993 | Iwasaki et al. | 430/321 |
| 5,255,336 | 10/1993 | Kuder et al. | 385/46 |
| 5,265,185 | 11/1993 | Ashley | 385/132 |
| 5,271,083 | 12/1993 | Lebby et al. | 385/130 |

OTHER PUBLICATIONS

T. Matsuura et al., "Low Loss, Heat-Resistant Optical Waveguides Using New Fluorinated Polyimides", *Electronics Letters*, vol. 29, No. 3, (Feb. 1993) pp. 269–270.

C. Puech, "Thin Film Optical Components Duplication Method", *Optical Communcations*, vol. 7, No. 2, Feb. 1973, pp. 135–138.

G. D. Aumiller et al., "Submicrometer Resolution Replication of Relief Patterns for Integrated Optics", *Journal of Applied Physics*, vol. 45, No. 10, Oct. 1974, pp. 4557–4562.

A. H. Cherin et al., "Multigroove Embossed-Plastic Splice Connector for Joining Groups of Optical Fibers", *Applied Optics*, vol. 14, No. 12, Dec. 1975, pp. 3026–3030.

A. Neyer et al., "Fabrication of Low Loss Polymer Waveguides Using Injection Moulding Technology", *Electronic Letters*, vol. 29, No. 4, Feb. 1993, pp. 399–401.

G. Grimes et al., "A Molded Polymeric Resin-Filled Coupler", *IEEE*, 1992, pp. 505–509.

(List continued on next page.)

*Primary Examiner*—Brian Healy
*Attorney, Agent, or Firm*—Gary L. Griswold; Walter N. Kirn; Lorraine R. Sherman

[57] ABSTRACT

An integrated optical coupler comprises a substrate with fiber-aligning grooves and waveguiding channels and a covering with complementary grooves and, optionally, channels. These couplers can be made from reproducible masters and electroplated molds made from those masters.

40 Claims, 4 Drawing Sheets

OTHER PUBLICATIONS

R. Ulrich et al., "Embossed Optical Waveguides", *Appl. Phys. Lett.*, vol. 20, No. 6, Mar. 1972, pp. 213–215.

B. L. Booth, "Low Loss Channel Waveguides in Polymers", *Journal of Lightwave Technology*, vol. 7, No. 10, Oct. 1989, pp. 1445–1453.

C. T. Sullivan et al., "Polymeric Waveguides", *IEEE Circuits and Devices*, No. 27, Jan. 1992, pp. 27–31.

S. Imamura et al., "Polymer Channel Waveguides With Low Loss at 1.3 µm", *Electronic Letters*, vol. 27, No. 15, Jul. 1991, pp. 1342–1343.

R. Ulrich et al., "Solution–Deposited Thin Films as Passive and Active Light Guides", *Applied Optics*, vol. 11, No. 2, Feb. 1972, pp. 428–434.

N. Takato et al., "Polymer Waveguide Star Coupler", *Applied Optics*, vol. 21, No. 22, Jun. 1982, pp. 1940–1942.

W. Tsang, "Optical Waveguides Fabricated By Preferential Etching", *Applied Optics*, vol. 14, No. 5, May 1975, pp. 1200–1206.

MicroParts product literature entitled "Passive Components for Plastic Optical Fiber Networks" from American Laubscher Corporation, Farmingdale, N.Y., Apr. 1993.

Preprint from Second International Conference on Plastic Optical Fibres and Applications, Jun. 28–29, 1993, "Characterization and Qualifications of Moulded Couplers for POF-Networks".

R. Cush, M. J. Goodwin and W. J. Stewart, "Passive Polymer Waveguide Technology for Low Cost Device Fabrication", Proceedings from OSA/ACS Meeting, Toronto, Canada, Oct. 1993.

INTEGRATED OPTICAL FIBER COUPLER AND METHOD OF MAKING SAME

FIELD OF THE INVENTION

This invention relates to optical couplers which couple input optical fibers to output optical fibers by means of prealigned waveguide channel cores and fiber grooves. In another aspect, molds on which are formed passive optical couplers, and a master from which these molds are made, are disclosed. The method for making this master is also disclosed.

BACKGROUND OF THE INVENTION

Optical couplers join one or more input optical fibers to one or more output optical fibers. They allow light being carried by an input fiber(s) to be transferred to, split between, or merged into an output optical fiber(s). They play an important role in fiber telecommunications, cable television links, and data communications.

At present, couplers are made by fusing optical fibers or by attaching fibers to a planar, glass integrated optical device which guides the light from the input fiber(s) to output fiber(s) attached at the opposite end of the device. Both of these methods are quite labor intensive and quite costly. The cost is also proportionate to the number of output fibers desired (because of the cost in carefully fusing or attaching each individual fiber). These labor-intensive processes also prohibit these devices from being mass produced.

Unlike optical couplers, channel waveguides are widely used and easily produced. In the past twenty years, numerous methods for producing these waveguides have been developed. For instance, electroplating nickel onto a master to form a channel waveguide mold and the use of photo-resist techniques to form waveguide channels have been known for a number of years. More recently, photolithographic techniques have been used to make improved waveguides. Cast-and-cure methods have also supplemented the older injection molding methods of forming polymeric channel waveguides. None of these techniques teach a means for passively aligning optical fibers to such channel waveguides, however.

In a recent publication (A. Neyer, T. Knoche, and L. Müller, *Electronics Letters*, 29, 399 (1993)), a method of cheaply reproducing numerous waveguides was disclosed. This method involved creating a master mold (for straight waveguide channels only) in photo-resist followed by electroplating in nickel, forming waveguide grooves in poly(methyl methacrylate) by injection molding, filling the grooves with a UV-cured resin having a high index of refraction, placing a flat top piece on the resin-substrate article, and curing the whole. In this publication, the authors suggested that this process could be used to simultaneously manufacture optical waveguide structures and fiber alignment grooves in one fabrication step. How this process could be modified to include such fiber groove formation and alignment was not mentioned or suggested.

SUMMARY OF THE INVENTION

Briefly, the present invention provides an integrated $n \times m$ optical coupler comprising a polymeric housing which encloses
  (a) n input optical fibers,
  (b) n waveguide entry channels, which divide or converge into m waveguide exit channels, and
  (c) m output optical fibers, wherein n and m are, independently, integers from 1 to 1024 inclusive, each of said n waveguide entry channels being aligned to the core of the respective n input optical fibers and each of said m waveguide exit channels being aligned to the core of the respective m output optical fibers by means of precisely aligned grooves in said housing, said waveguide channels being filled by at least one polymerizable monomer which is capable of being cured to provide waveguiding cores.

In another aspect, the present invention provides a polymeric housing for enclosing and prealigning optical fibers and channel waveguide cores comprising
  (a) a substrate member, comprising
    (i) a first portion, one horizontal surface of which contains n grooves for holding n input optical fibers,
    (ii) a second portion, one horizontal surface of which contains n waveguide entry channels which divide or converge into m waveguide exit channels, and
    (iii) a third portion, one horizontal surface of which contains m grooves for holding m output optical fibers;
  and
  (b) a covering member, comprising
    (i) a first portion, one horizontal surface of which contains n grooves for securing n input optical fibers,
    (ii) a second portion, one horizontal surface of which is substantially flat, and
    (iii) a third portion, one horizontal surface of which contains m grooves for securing m output optical fibers;
wherein n and m are, independently, integers from 1 to 1024 inclusive, said n grooves and m grooves being fashioned so that the cores of optical fibers to be held therein will be properly aligned with the ends of said corresponding waveguide channels, said substrate and covering being formed in such a way so that the two members can be adhesively joined together to form a housing which is substantially unitary.

In a further aspect, the present invention provides a mold on which is formed the above polymeric housing for enclosing and prealigning optical fibers and channel waveguides.

In a still further aspect, the present invention provides a master on which is electroplated the above mold on which is formed the polymeric housing for enclosing and prealigning optical fibers and channel waveguides.

In yet another aspect, the present invention provides a method for making a mold on which is formed the aforementioned polymeric housing for enclosing and prealigning optical fibers and channel waveguides comprising the steps:
  a) photolithographically etching a silicon wafer so as to form fiber-alignment grooves;
  b) coating the wafer with a photo-resist material;
  c) patterning in the photo-resist waveguiding channels which are aligned with the fiber-alignment grooves;
  d) electroplating said patterned wafer with a layer of a metal so as to provide a metallic complement to said wafer; and e) separating this metallic complement from the wafer.

In this application, the following definitions will apply:

"cast-and-cure" means the application of monomers, either alone or with additives such as polymers, glass particles, and oligomers, which can (in the liquid state) conform to a mold and which can be polymerized;

"channel waveguide" or "waveguiding channel" means a light-guiding conduit consisting of an extended, optically-transparent medium surrounded by an optically-transparent medium of lower refractive index;

"optical coupler" means a device which joins one or more input optical fibers to one or more optical output fibers and include splitters and combiners;

"(meth)acrylate" means acrylate, methacrylate, acrylamide, and methacrylamide compounds; and "group" or "compound" or "monomer" means a chemical species that allows for substitution by conventional substituents which do not interfere with the desired product.

The present invention teaches a polymeric housing which prealigns the cores of optical fibers and waveguide channels. This housing is comprised of two members: a substrate and a covering. In the substrate member of the housing are found grooves and channels. The grooves hold optical fibers and the channels are filled with at least one polymerizable monomer which, upon curing, forms waveguide channel cores. This polymeric housing can be formed by cast-and-cure microreplication from a mold. The mold in turn is formed by electroplating a metal onto a master and then separating the mold from that master. In this master are delineated the aforementioned grooves and channels. These grooves and channels are formed to strict tolerances so that the cores of optical fibers which are inserted in the grooves of the polymeric housings derived from this master are precisely aligned with the waveguide channel cores defined by the channels of the polymeric housings derived from this master.

Currently available couplers are individually manufactured and are thus labor intensive. By carefully forming a master from which numerous daughter molds can be made, the optical couplers of the present invention can be mass produced. Formation of grooves which are precisely formed so that fibers inserted therein will be prealigned with the corresponding waveguide channels is the step which would allow passive optical couplers to be easily produced. This overcomes the limitation inherent in articles produced according to the process described in the Neyer et al. publication discussed previously. In other words, if such articles were to be used as optical couplers, they would be subject to the same high costs of manual alignment.

When completely assembled, the optical couplers of the present invention comprise optical fibers surrounded by polymeric materials. Once optical fibers are secured in the grooves of a coupler of the present invention, which precisely align the cores of those fibers with the corresponding waveguide channel cores, they are unlikely to become misaligned due to thermal expansion of the surrounding materials. This also is an advantage over the articles produced by the process described by Neyer et al.

Where couplers of the present invention are sufficiently thick, the sandwich construction thereof provides a hermetic seal. This reduces the chance that the optical characteristics thereof will change due to moisture absorption.

DETAILED DESCRIPTION OF THE DRAWINGS

Figure 1:
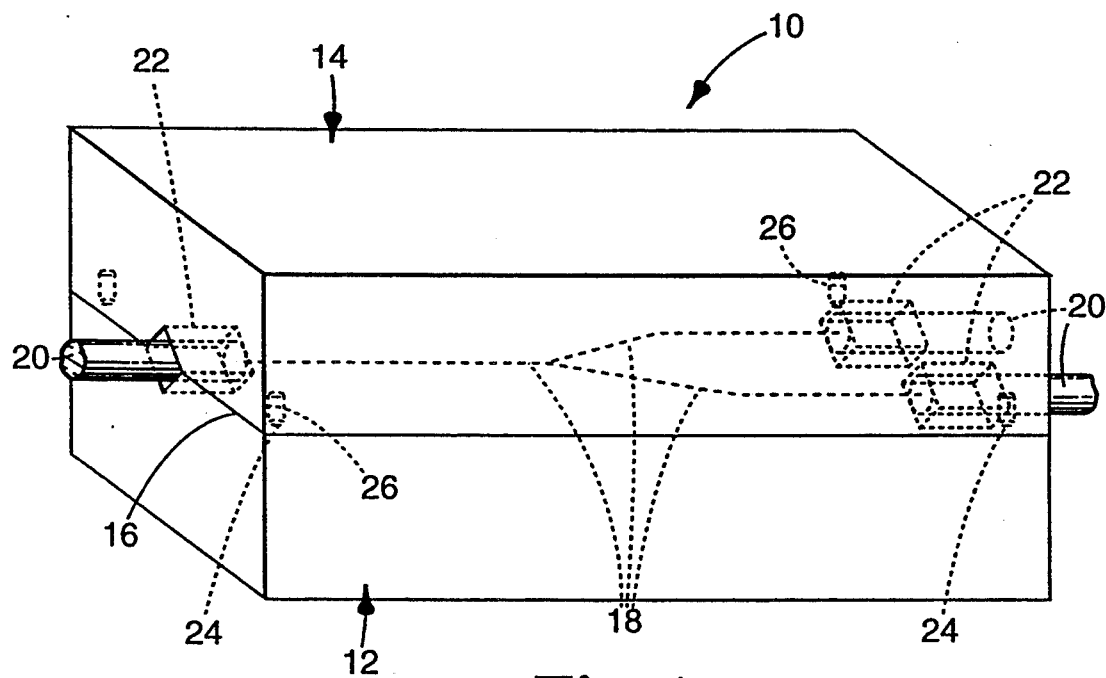
FIG. 1 is a greatly enlarged, schematic perspective view showing one embodiment of an optical coupler of the present invention.

FIG. 1 shows 1×2 optical coupler 10 having substrate 12 and covering 14 which are adhesively joined by a thin layer of monomer 16. Monomer 16 covers the top face of substrate 12 and fills waveguide channels 18. (Waveguide channels 18 are shown as lines because of their relative size.) Monomer 16 also surrounds optical fibers 20 in fiber-aligning grooves 22. Small protrusions 24 in substrate 12 slide fit into small depressions 26 in covering 14 and aid in the alignment of substrate 12 and covering 14.

Figure 2:
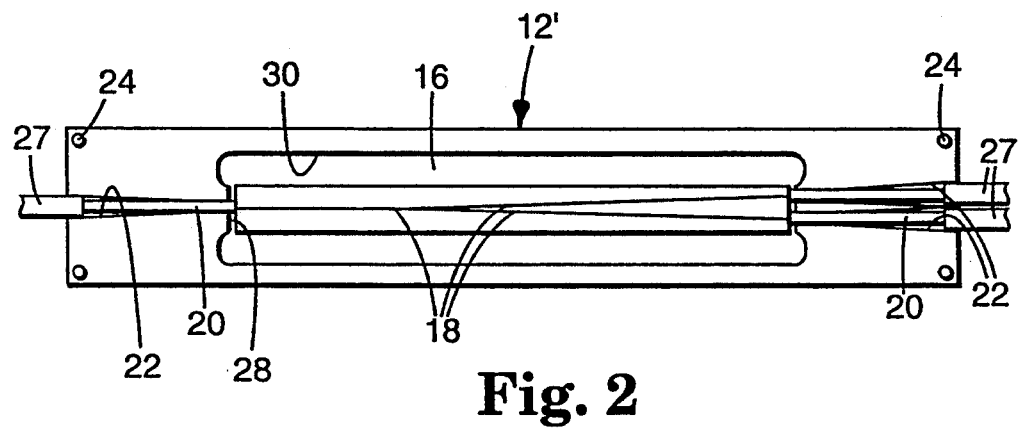
FIG. 2 is a greatly enlarged perspective view, portions broken away, showing the substrate portion of one embodiment of an optical coupler of the present invention.

FIG. 2 shows a second embodiment of 1×2 optical coupler substrate 12' which passively aligns optical fibers 20, portions of which are still surrounded by cladding 27, in fiber-alignment grooves 22. Optical fibers 20 are (optically) connected by waveguide channels 18. (Waveguide channels 18 are again shown as lines because of their relative size.) Perpendicular gaps 28 connect reservoirs 30. Waveguide channels 18, fiber-alignment grooves 22, gaps 28, and reservoirs 30 are filled with monomer 16. (Although not shown for the sake of clarity, a thin layer of monomer 16 also covers the top face of substrate 12'.) Protrusions 24 on the top face of substrate 12' aid in the alignment of substrate 12' with its corresponding covering (not shown).

Figure 3:
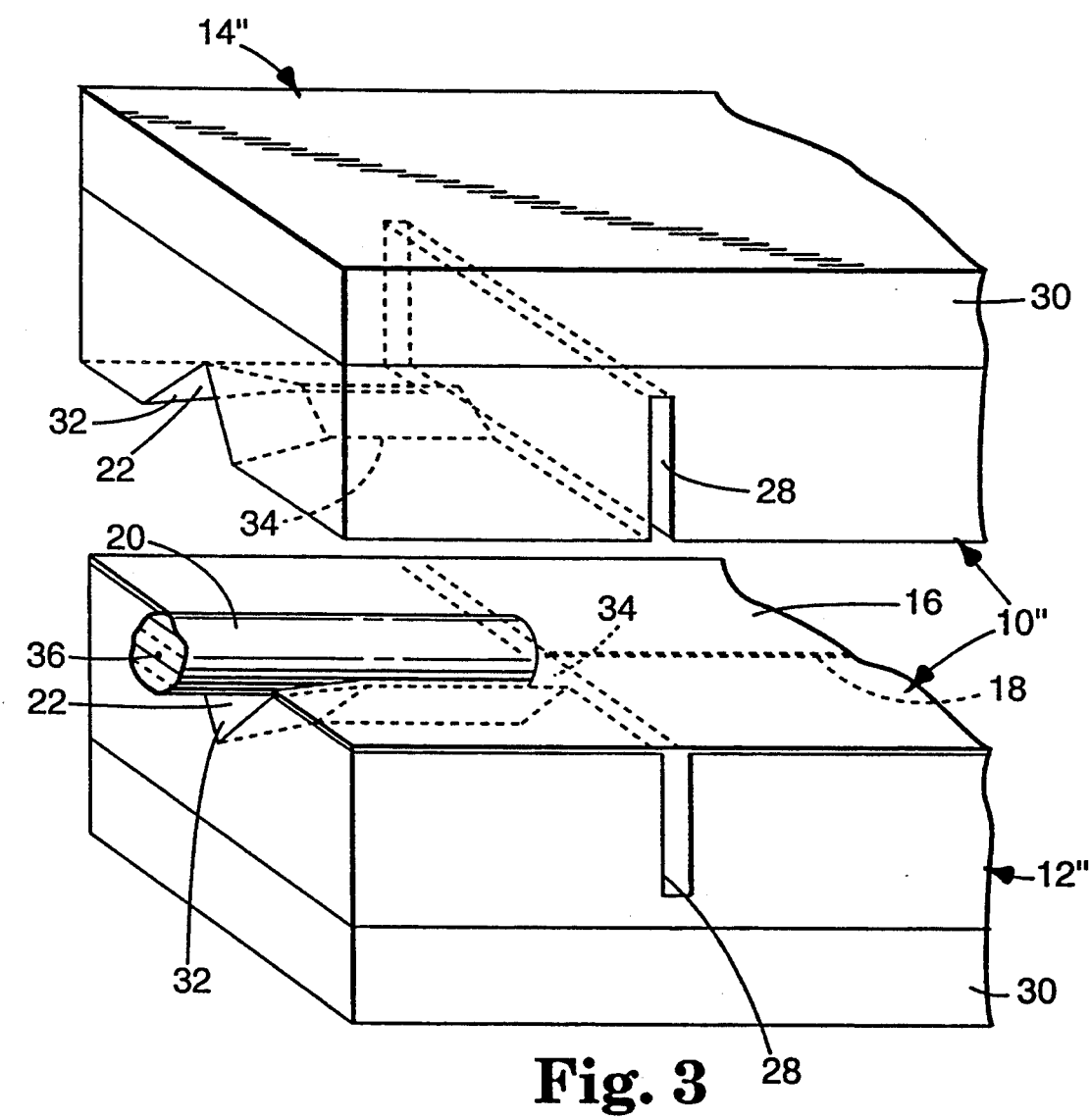
FIG. 3 is a greatly enlarged perspective view, portions broken away, showing the fiber - waveguiding channel interface of one embodiment of an optical coupler of the present invention.

FIG. 3 shows an enlarged view of a portion of 1×2 optical coupler 10''. Particularly, that which is shown is the area at the junction of waveguide channel 18, optical fiber 20, fiber-aligning grooves 22, and gaps 28 in substrate 12'' and covering 14''. Both substrate 12'' and covering 14'' are reinforced with backing 30. Fiber-alignment grooves 22 narrow (horizontally) from opening 32 at outside of coupler 10'' to opening 34 at gap 28, as well as slightly tapering (vertically) from opening 32. A thin layer of monomer 16 covers the top face of substrate 12'' and fills waveguide channel 18, gaps 28, and the portions of fiber-aligning grooves 22 not filled by optical fiber 20. The narrowing and tapering of fiber-alignment grooves precisely align core 36 of optical fiber 20 to waveguide channel 18. When covering 14" is placed on substrate 12", using protrusions 24 and depressions 26 to aid in alignment, fiber-alignment grooves 22 fit securely around and hold optical fiber 20.

Figure 4:
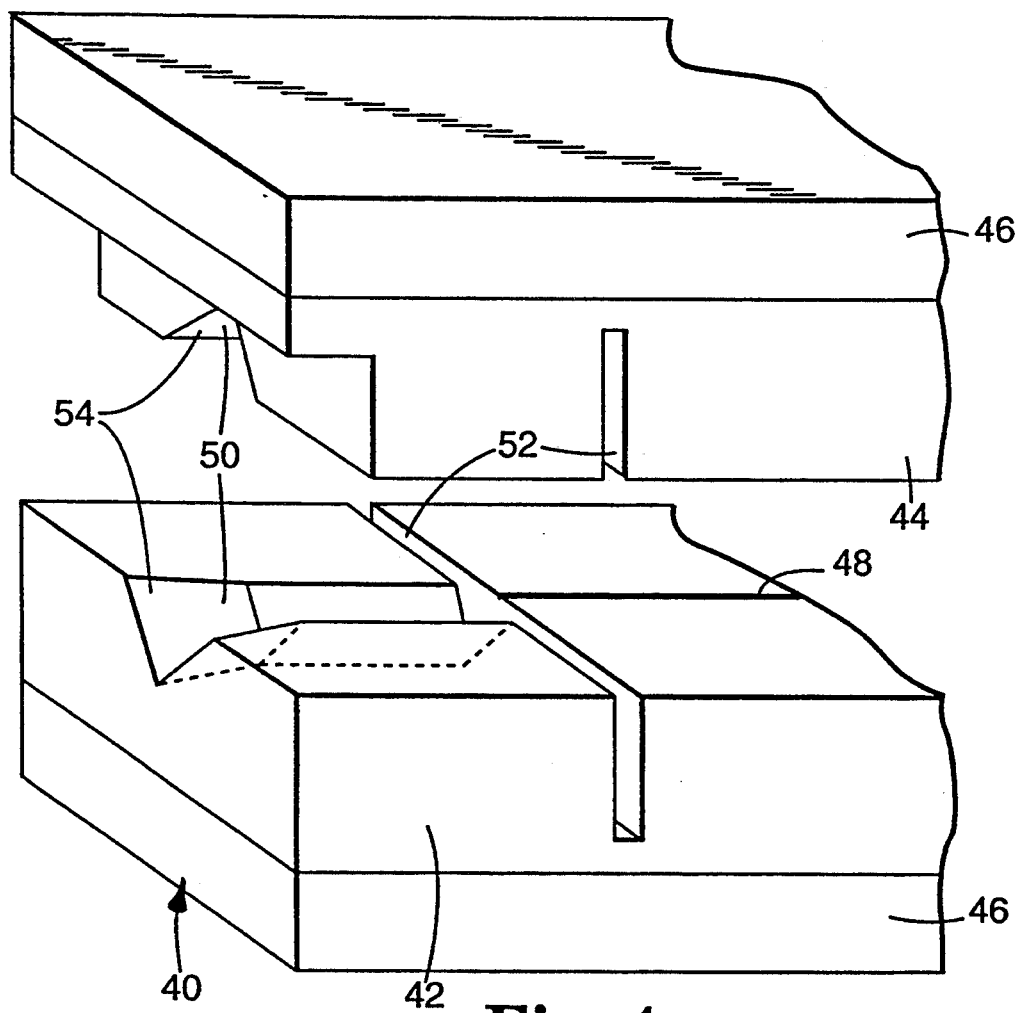
FIG. 4 is a greatly enlarged perspective view, portions broken away, showing one end of one embodiment of an optical coupler housing of the present invention.

FIG. 4 shows one end of one embodiment of housing 40 having substrate 42 and covering 44, both of which are reinforced with backings 46. In substrate 42, waveguide channel 48 is separated from fiber-alignment groove 50 by gap 52. In covering 44 are fiber-alignment groove 50 and gap 52. Fiber-alignment grooves 50 narrow (horizontally) and taper (vertically) from opening 54.

Figure 5:
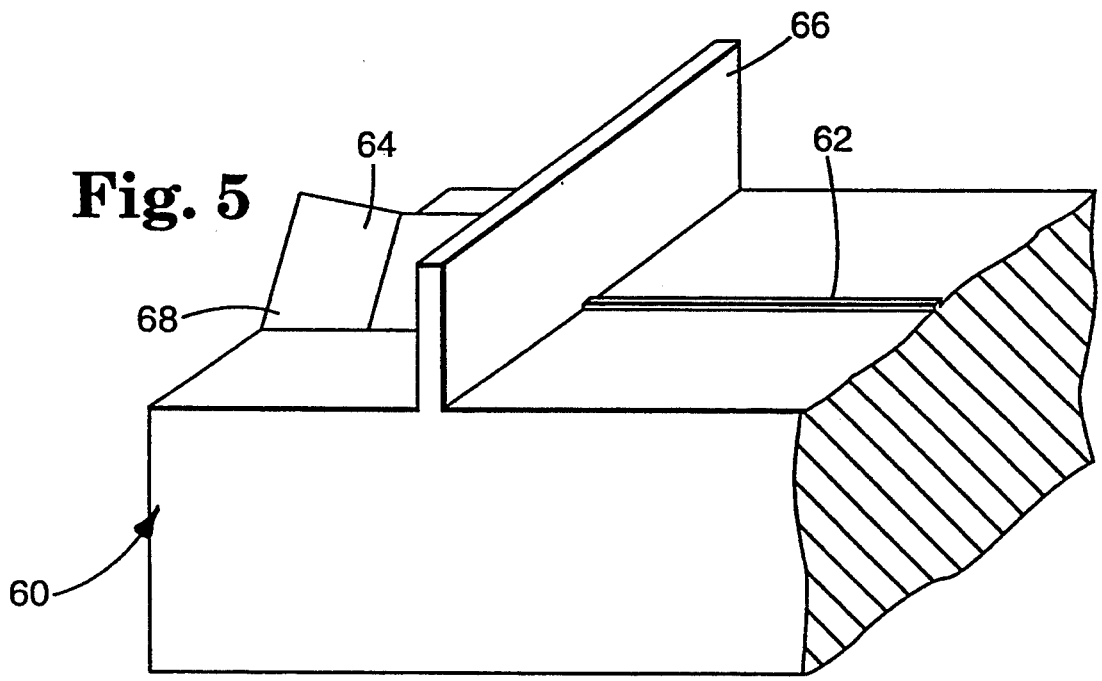
FIG. 5 is a greatly enlarged perspective view, portions broken away, showing one end of the substrate of one embodiment of a mold from which can be replicated an optical coupler housing of the present invention.

FIG. 5 shows one end of one embodiment of mold 60 having waveguide channel rib 62 and fiber-alignment groove ridge 64 separated by gap-forming piece 66. Fiber-alignment groove ridge 64 narrows and tapers from edge 68 toward gap-forming piece 66. (The mold for a covering has been omitted for the sake of clarity.)

Figure 6:
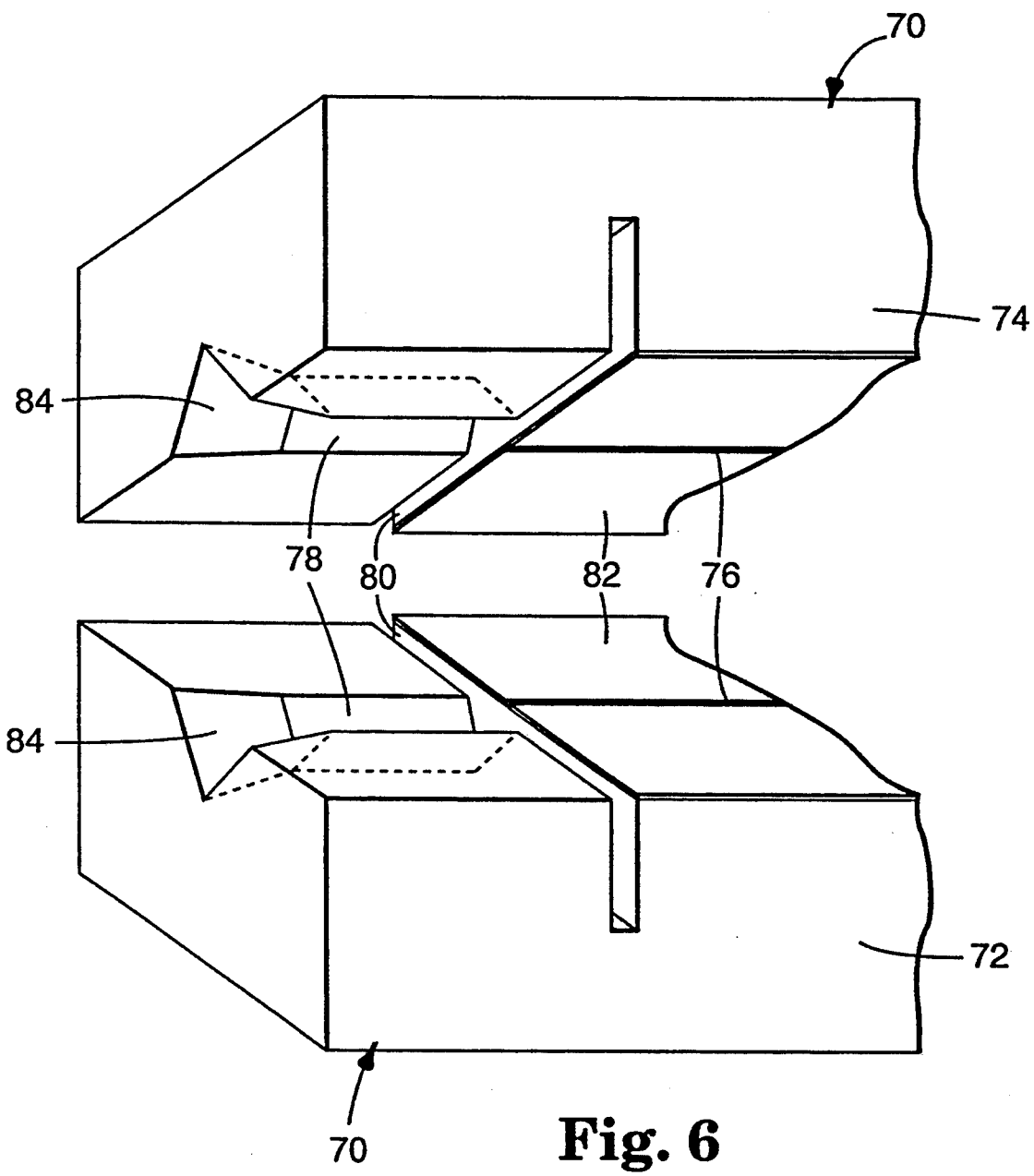
FIG. 6 is a greatly enlarged perspective view, portions broken away, showing one end of one embodiment of a master from which can be replicated a mold of the present invention.

FIG. 6 shows one end of one embodiment of master 70 having substrate member 72 and covering member 74. Both members comprise waveguide channels 76 and fiber-alignment grooves 78 separated by gaps 80. The portions of substrate member 72 and covering member 74 in which waveguide channels 76 are inscribed are covered by a thin layer of photo-resist material 82. Fiber-alignment grooves 78 narrow and taper from opening 84.

DETAILED DESCRIPTION OF PREFERRED EMBODIMENTS

Preparation of the optical coupler of the present invention requires the formation of a master. From this master are made daughter molds on which are microreplicated optical couplers of the present invention. An optical coupler of the present invention is made directly from a daughter mold which, in turn, is made by electroplating on a master. Therefore, the master will necessarily have the same pattern as the desired coupler, and a mold made from this master will have a complementary (reverse) pattern, i.e., the mold must have raised ribs where grooves are desired on the optical coupler.

Once a master with the desired waveguide channel pattern is formed, providing multiple daughter molds is relatively easy and inexpensive. Once these molds are made, they can be used to mass produce the optical coupler of the present invention. This is in stark contrast to the present manner of producing optical couplers which involves the labor intensive step of fusing optical fibers to one another or attaching them to a planar, glass integrated optical device.

I. Making the Master

Because the daughter molds will have dimensional tolerances which are complementary to those of the master from which they are formed, great care must be taken in forming the masters. Particularly, the waveguide channels and fiber grooves must be delineated in the master to precise tolerances. More particularly, where (for example) single mode operation is desired, channels with an $8 \times 8$ $\mu m^2$ cross section must be aligned to submicron precision with fiber grooves which hold fibers having a much larger cladding radius (e.g., 62.5 $\mu m$). Additionally, the vertical walls of those channels must be quite smooth to reduce light scattering loss.

In choosing materials from which to make the master, the primary requirement is that the materials be capable of being patterned with (a) channels, ranging in width and depth from approximately 8 $\mu m$ to approximately 100 $\mu m$, the walls of which are smooth to a submicron scale, and (b) grooves which can hold optical fibers. A variety of materials including polymer films, silicon oxide, and silicon nitride can be used to form the master, depending on the method chosen to form the channels and grooves. Because photolithography combined with wet development in photo-resist has proven to be a preferred method of channel formation and photolithography in silicon using anisotropic etching has proven to be a preferred method of groove formation, a particularly preferred material is silicon coated with a photo-resist material.

Because the housing which will eventually be formed from the master will comprise two members, i.e., a substrate and a cover, the master must comprise the exact duplicates of these members. Preferred methods of forming these members are discussed below.

A. Substrate

Potential methods for forming grooves and channels include diamond turning, laser ablation, and photolithographic techniques. The usefulness of the first of these techniques is severely limited by the difficulty involved in forming curved channels and grooves with abrupt ends. Because the present invention involves the formation of passive optical couplers in which curved channels may be necessary (because light from a single fiber may be split into a number of output fibers), and because fiber alignment grooves may end abruptly at the beginning of waveguide channels, the applicability of diamond turning as a groove- and channel-forming method is quite limited.

Although laser ablation offers the necessary flexibility in the generation of waveguide channel patterns, it is not as routinely used in the micro-electronics industry and is thus not as fully developed as photolithography.

Preferably, photolithographic techniques are used to form the necessary grooves and channels of the present invention. More specifically, channels can be formed in photo-resist by common mask and exposure development techniques. Fiber-holding grooves can be formed in Si crystal wafers by photolithographic patterning followed by anisotropic etching in a basic solution, e.g., a KOH solution. The procedures used to form these grooves and channels are discussed more fully below.

1. Grooves

Because silicon has been found to be particularly amenable to the following etching process and is therefore a preferred material, it has been used for the purposes of the following discussion. Silicon crystal (100) wafers are a particularly preferred base material for the master substrate. However, those skilled in the art will recognize that the following method can be adapted for use with a variety of base materials.

In order that input and output optical fibers be securely held in and be precisely aligned with the channel waveguides of the housing which will result from the master, grooves capable of holding such fibers must be formed in the end portions of the silicon crystal wafer. Using a simple $1 \times 2$ splitter as an example, one end of the wafer will have a single groove whereas the other will have two grooves. The preferred method for forming these grooves is well known and can be found in a number of sources including Tsang et al., *Applied Optics*, 14, 1200 (1975).

On a clean silicon wafer is deposited a masking layer such as silicon nitride, or silicon oxide. This layer can range in thickness from 50 to 200 nm, although 100 nm has been found to work particularly well. This layer is then patterned by means of conventional photolithography. For instance, a photo-resist material can be spin coated onto the surface of the substrate, preferably after the application of an adhesion promoter. After heating to remove solvent (i.e., soft baking), the fiber groove pattern is applied by exposing the photoresist to a light source, preferably a source of ultraviolet light such as a mercury lamp, through a mask aligned in the <110> crystal direction. Once patterned, the photo-resist is developed according to processes well known in the art.

The patterned, exposed silicon nitride masking layer is then etched by one of a number of well known means in the art, although reactive ion etching (e.g., $CF_4$ and oxygen) has been found to be a preferred etching means. By carefully controlling the etching time and rate, the desired amount of the patterned masking layer is etched to expose the substrate material (e.g., silicon wafer). Once this is completed, remaining photo-resist is removed by rinsing with an organic solvent in which the photoresist is soluble. A common solvent for this purpose is an acetone/isopropanol solution. Remnants of photoresist can be removed by rinsing in an acidic medium.

Once the masking layer has been etched, the silicon crystal wafer is anisotropically etched with a strongly basic solution. A particularly preferred etching solution is an aqueous 30% (by weight) potassium hydroxide solution. This step can be performed at an elevated temperature to decrease the amount of time necessary to complete the groove-formation etching. A temperature of 80° C. has been found to provide a sufficiently short etching time.

Etching depth can be controlled by adjusting the concentration of the etching solution, the temperature at which the etching is carried out, the amount of time the etching solution is allowed to contact the substrate, or a combination of these factors. Controlling groove depth is important to ensure optimum alignment of the optical fibers to the waveguide channels. Using a single mode fiber as an example, a groove width (at the upper surface of the substrate) in the range of 140 to 160 μm is desirable to ensure that the core of the inserted fiber (approximately 62.5 μm from the surface of the fiber) is at the same height as the corresponding channel waveguide core. (This groove width is somewhat greater than might appear optimal to account for dimensional changes inherent in the polymeric housing forming process discussed below.) Groove depths can range from about 50 to 500 μm, preferably from 60 to 200 μm, depending on the type of fiber which is to be used. Grooves should be of such a length that fibers inserted in the grooves of the resultant housing will be securely held and supported. Groove lengths as small as 1 mm could be effective for this purpose, although lengths of about 3 mm are preferred.

For some applications, providing a tapered groove may be desired (i.e., to aid in the insertion of fibers). For instance, a groove which (horizontally) narrows from the outside edge toward the waveguide channel and which (vertically) tapers in the same direction might make easier the fiber insertion process.

Once the desired grooves are etched, the remainder of the silicon nitride masking layer is removed. This is accomplished by the same type of masking layer etching as described above.

When completed, this process provides a silicon crystal wafer with the desired groove pattern etched therein.

2. Channels

On the center portion of the patterned silicon crystal wafer, i.e., that portion between the two sets of grooves, is deposited another photo-resist layer, preferably after the application of an adhesion promoter. This layer can be applied to a thickness of up to 200 μm, preferably up to 100 μm. This photo-resist layer is then patterned, irradiated, and developed as described in the groove formation process.

Controlling the dimensions of the channels is of great import since the channel dimensions should be as close as possible to the dimensions of the core of an optical fiber. Channel widths and depths are carefully controlled by precisely designing the mask pattern, monitoring the time the photo-resist is exposed to a light source (as described above), adjusting the amount of time the developer is allowed to etch the photoresist, or a combination of these variables. Widths and depths range from 1 to 200 μm, preferably from 5 to 100 μm, even more preferably from about 5 to 8 μm, and will depend on the type of fibers which are to be aligned with these channels. For instance, where single mode optical fibers operating at 1.31 and 1.55 μm wavelengths are to be coupled, channel widths and depths will be approximately 8 μm, the diameter of a single-mode fiber core.

In some applications, the groove-forming process may leave a beveled portion of silicon crystal wafer between the channels and the bottom of the grooves. This can be corrected by cutting across the groove/channel interface so as to form a trench between the fiber-holding groove and the waveguide channel. A diamond-edged saw can be used to effect this cut.

The spin coating process (used in applying the photoresist material) tends to produce an accumulation of photo-resist material at surface discontinuities (i.e., grooves). Such accumulations hinder the formation of channels of uniform depth. To reduce these accumulations, a succession of photo-resist applications by high-rpm spin coatings and dryings can be used to build a layer of proper thickness. This method provides better control of photo-resist thickness uniformity than does covering the wafer with photo-resist material and subjecting it to a single low-rpm spin coating process. Once photo-resist has been deposited, photo-resist material at the groove/channel interfaces is photolithographically removed up to 1 mm, preferably a few hundred microns, from the edge of the groove/channel interface. In other words, the channel mask is designed so that, between the channels and the grooves, is a perpindicular gap up to 1 mm wide. When the photo-resist is exposed and developed, this perpindicular gap creates a small space between the ends of the channels and the ends of the grooves. The portions of the substrate exposed by the formation of these spaces can be cut with a diamond-edged saw, preferably at the same time the beveled portion of the silicon crystal wafer is being cut, to at least the same depth as that of the lowest point of a fiber inserted into a substrate groove so that such a fiber has a clear path to the edge of the corresponding waveguiding channel.

If desired, reservoirs can be similarly etched or cut into the portion of the substrate in which the waveguiding channels are located. These reservoirs act as means of capturing and storing any excess monomer used to fill the channels of the housings produced from these masters. These reservoirs are approximately the same length as the channels (i.e., at least a few millimeters), but their widths and depths will be larger so as to ensure that a substantial portion of any excess monomer is captured. They are connected to the ends of the channels by means of a trench which perpendicularly connects the channels and reservoirs. This trench preferably is cut in the gap discussed in the preceding paragraph.

B. Covering

This member is formed in much the same way as the substrate. In other words, grooves and channels are formed in the silicon substrate as described above. If channels are also formed in the covering, the depth of the channel in the substrate should be adjusted so that the depth of the whole channel is the same as the diameter of the fiber core. However, the channel-formation step can be eliminated so that a flat covering is obtained. Doing so eliminates the possibility that the covering channel(s) will be improperly aligned with the substrate channel(s) once the housing pieces are formed.

Alternatively, channels can be formed in the covering only. This can result in the elimination of the channel-formation step described above for the substrate. This alternative results in masters from which will be formed housing substrates which are flat, i.e., all light transmitted by the housing will be through the channel waveguide core located completely in the covering.

II. Making the Mold

Molds are made from the masters of the previous section by an electroplating process. This produces a durable metal mold with the desired groove and channel patterns.

A silicon/photo-resist master is first coated with a film of a metal such as nickel, copper, zinc, silver, or an alloy of a metal, to provide a conductive seed layer. This seed layer is preferably about 20 nm thick. The coated master is electroplated with about 0.64 mm (25 mils) of a metal such as nickel, copper, zinc, or silver, although nickel is particularly preferred. A particularly preferred mold is nickel electroplated on a nickel seed layer.

The mold is then separated from the master. This can be done by any physical means such as prying apart the two pieces. Release of the master from the nickel mold can be enhanced by first depositing a silicon oxide coating on the silicon/photo-resist surface (of the master) using plasma enhanced chemical vapor deposition. This release layer preferably has a thickness of about 100 nm.

III. Microreplication of the Housing

A housing of the present invention comprises a substrate and a covering. Therefore, both members must be formed on their respective molds. Both substrates and coverings can be formed by either casting or injection molding techniques.

When assembled, the optical couplers of the present invention are up to a few centimeters in length and have a thickness of up to a few millimeters, although couplers which are as small as possible are normally desired. The width of the coupler will be depend on the number of input or output fibers which are to be inserted. For instance, simple 1×1 or 1×2 couplers can be made quite narrow (i.e., approximately the width of two optical fibers) whereas couplers with 20 or more input or output fibers would be significantly wider.

The housing substrate and covering should have an index of refraction which is quite similar to, preferably within $1 \times 10^{-4}$, that of the optical fiber cladding. Although few compounds have such a refractive index, mixtures of monomers (or monomer precursors) with higher and lower refractive indices can be combined to provide a monomer mixture which, upon polymerization, has the desired index of refraction. Polymers useful in forming the housings of the present invention include epoxies, poly(meth)acrylates, poly(vinyl azlactones), poly(urethanes), and poly(ureas). These polymers can optionally be substituted with atoms such as fluorine and deuterium in order to reduce their refractive indices and to reduce absorptive losses in near infrared wavelengths. Additionally, colloidal silica, such as that described in U.S. Pat. No. 4,885,332, can be added to the monomer mixture from which the above polymers are formed to provide lower refractive indices and reduced thermal expansion coefficients.

An example of a suitable monomeric combination is Photomer TM 4127 propoxylated neopentyl glycol diacrylate (Henkel Corp.; Morristown, N.J.) or ethylene glycol dimethacrylate (Aldrich Chem. Co.; Milwaukee, Wis.) mixed in a ratio such as 89:11 (by weight) with perfluorocyclohexyl acrylate (PcHA), as described in U.S. Pat. No. 4,968,116 (col. 11), with approximately 1% (by weight) of a photoinitiator such as Irgacure TM 651 2,2-dimethoxy-2-phenylacetophenone (Aldrich). Crosslinking agents, e.g., multifunctional acrylates such as trimethylol propane triacrylate (TMPTA) (Scientific Polymer Products, Inc.; Ontario, N.Y.), can also be added to reduce solubility and to raise the glass transition temperature of the polymer.

No matter which of the following techniques is chosen, the resulting substrate member of the housing will comprise grooves for holding input optical fibers on one end, grooves for holding output optical fibers at the other end, and the desired channel pattern between the two sets of grooves. Because of the precise etching of the master (described above), fibers which are inserted into the grooves will be aligned with the corresponding channel entry or exit.

A. Casting

The casting technique basically involves the steps of pouring a liquid monomer or a mixture of monomers onto a mold and then curing it/them. Enough monomer or monomer mixture should be used to at least fill the grooves and cover the face of the mold, including the grooves and waveguide channels.

If desired, a release agent such as Mold Release 225 TM (RAM Products; Gardenia, Calif.) can be applied to the mold prior to application of the monomer(s) to facilitate separation of the housing from the mold.

Once the monomer (or mixture of monomers) has been poured on the mold, a stiff backing such as a sheet of poly(methylmethacrylate), poly(carbonate), or a metal such as aluminum or stainless steel can be pressed against the monomer. This may be desired where the substrate must display a certain amount of structural integrity.

The monomer (or monomer plus backing combination) is then cured by any of a variety of photo or thermal means known in the art. The cured housing, plus backing if one was used, is then physically separated from the mold.

If a polymeric backing has been used, the backing can be oxygen plasma treated to enhance its adhesion to the polymeric housing. This involves placing the backing in a reactive ion etching chamber, having an oxygen atmosphere (approximately 26.7 Pa, i.e., 200 millitorr), for approximately ten minutes. If a metallic backing has been used, its adhesion to the substrate can be promoted with an adhesion enhancer.

B. Injection Molding

Standard molding techniques known in the art may also be used to form the housings of the present invention. These techniques require that molds be placed in an injection molding apparatus where polymers with suitable optical properties (such as those described in the "Casting" section) be injected and then separated from the mold.

A backing can be glued onto the replicated housing prior to or after the housing is separated from the mold.

IV. Assembling the Coupler

Once a housing with the desired pattern has been prepared, a few simple steps will produce a passive optical coupler where the input and output optical fibers are precisely aligned with the corresponding channel waveguide cores.

A mixture of one or more polymerizable monomers is poured into the channels formed in either or both of the substrate and covering members. Monomers similar to those used in making the substrate and covering, including fluorinated and deuterated derivatives as well as colloidal silica-containing monomers, can be used. Once the monomer (or mixture of monomers) has been cured so as to produce waveguiding cores, the refractive indices of those waveguiding cores is preferably as close as possible to the refractive indices of the cores of the optical fibers to be inserted. Additionally, for single mode fiber waveguides, the index of refraction of the waveguiding core polymer (i.e., the cured monomer) preferably is no more than $7 \times 10^{-3}$ greater than and no less than $2 \times 10^{-3}$ the refractive index of the housing. (Where multimode fibers are to be used, this difference between the indices of refraction of the waveguiding core polymer and the housing is preferably no more than 0.5.) If desired, multifunctional acrylates and methacrylates, such as TMPTA, can be added to the composition to crosslink the waveguiding core polymer.

Cleaved or polished optical fibers are then inserted into the grooves of the piece in which the channels are located. (If channels have been formed in both pieces, the fibers can be inserted in the grooves of either piece.) The other housing member is then placed on the first so that its grooves and those of the first piece form a snug fit around the optical fibers. The assembly may then be cured when desired by any of a variety of photo or thermal means known in the art. The fibers will preferably be butted directly against the channel waveguide core, although a slight amount of separation between the fiber and the channel waveguide core does not significantly affect coupling efficiency.

Alternatively, the covering and the substrate can be filled with liquid monomer(s) after inserting the optical fiber. Once the pieces are fit together to form the housing assembly, the monomer(s) can be cured as described immediately above.

To make easier the aligning of the grooves and channels of the substrate and covering, the pieces can be adapted to include conventional fastening means. For instance, the substrate master can be modified to include one or more small protuberances, while the covering master can be modified to include complementary small recesses which fit over the protuberances. Alternatively, the covering could include the protuberances while the substrate contained the complementary recesses. One of the pieces might also be formed with an encircling ridge which slide fits into a complementary encircling trough in the other piece.

Once the coupler has been assembled, it can be placed in a protective jacket. This jacket can be either polymeric or metallic.

Objects and advantages of this invention are further illustrated by the following examples. The particular materials and amounts thereof, as well as other conditions and details, recited in these examples should not be construed to unduly limit this invention.

EXAMPLES

Example 1: Formation of Grooves in Master

On a clean, three-inch silicon wafer was grown a layer of silicon nitride (approximately 100 nm) using a mixture of 60 standard cubic centimeters per minute (sccm) $NH_3$ and 20 sccm dichlorosilane at 800° C. for about thirty minutes.

To this silicon nitride layer was spin coated an excess of Shipley C-50 TM adhesion promoter (Shipley Co., Inc.; Newton, Mass.) which was then dried for a few minutes at room temperature. Thereafter, an excess of Shipley 1818 TM photo-resist was spin coated on the silicon nitride layer at 4000 rpm.

The coated wafer was then baked at 90° C. for approximately thirty minutes. After the wafer was removed from the heat source, a mask with a 1-input fiber/1-output fiber pattern was aligned along the <110> crystal direction. The photo-resist was patterned by exposing the masked wafer to a mercury lamp ($\lambda = 400$ nm) at 5.5 mW/cm² for about 20 seconds. The mask was removed, and the photo-resist immersed with Shipley 319 TM developer. The wafer was then washed with water and thoroughly dried (approximately five minutes) at 120° C.

The silicon nitride in the area of the fiber grooves was removed by reactive ion etching (20 sccm of $CF_4$ and 0.5 sccm of oxygen for approximately five minutes). Remaining photo-resist was removed by rinsing the master in an acetone/isopropanol solution, then in an $H_2SO_4/H_2O_2$ solution.

The exposed areas of the silicon wafer were then etched with an aqueous solution of 30% (by weight) KOH at a temperature of 80° C. and a rate of 1.4 $\mu$m/min. Because the wafer had been patterned along the <110> crystal direction, V-shaped grooves were formed. These groove were 125 $\mu$m deep and 3 mm long.

The silicon nitride which remained between the grooves was removed by reactive ion etching in 20 sccm of $CF_4$ and 0.5 sccm oxygen for approximately five minutes.

Example 2: Formation of Channels in Master

The V-grooved silicon wafer from Example 1 was coated as in Example 1 with Shipley C-50 TM adhesion promoter. Thereafter, an excess of Shipley STR1075 TM photo-resist was spin coated onto the wafer at 3800 rpm for about 60 seconds. The wafer was then dried at 100° C. for approximately two minutes. The resulting photo-resist layer had a thickness of 7.5 $\mu$m.

A mask with a $1 \times 1$ pattern was then placed on the coated substrate. The unmasked areas of photo-resist were then exposed to a mercury lamp ($\lambda = 400$ nm) at 5.5 mW/cm² for about 80 seconds. The mask is then removed, and the photo-resist washed with Shipley 319 ™ developer for about 60 seconds. The coated wafer was then rinsed with water and dried.

The beveled ends of the V-shaped fiber-alignment grooves were removed by dicing a 75 μm-wide trench across the ends of the grooves at the groove—channel interface with a diamond-edged saw.

Example 3: Making the Mold

On the grooved and channeled silicon/photo-resist master from Example 2 was deposited a 100 nm layer of silicon oxide to act as a release layer. This was done by plasma-enhanced chemical vapor deposition, at room temperature, with 40 sccm $N_2O$ and 8 sccm $SiH_4$. On this release coating layer was deposited, by electron beam evaporation, an approximately 20 nm seed layer of nickel.

The nickel-coated master was then mounted onto a stainless steel plate, and this assembly was immersed in a 50° C. nickel sulfamate solution containing a nickel counterelectrode. A current density of 0.022 $A/cm^2$ (20 $A/ft^2$) was applied so as to plate 25.4 μm (1 mil) of nickel per hour.

After a 0.51 mm (20 mil) coating had been applied, the assembly was removed and rinsed with water. The nickel mold was then carefully pried away from the silicon/photo-resist master.

Example 4: Backing for Housing

Two 0.56 mm (22 mil) thick sheets of poly(methylmethacrylate) (PMMA) were treated with oxygen plasma (26.7 Pa at room temperature) for approximately 10 minutes in order to improve adhesion between them and the polymeric housing material. These treated PMMA sheets were cut to 3.5 cm×6 cm.

Example 5: Cast-and-cure Microreplication of Housing

The nickel mold from Example 3 was treated with Mold Release 225 ™ (RAM Products) to facilitate release of polymer from the mold.

Thereafter, an 89:11 (by weight) mixture of Photomer 4127 ™ (Henkel) propoxylated neopentyl glycol diacrylate and perfluorocyclohexyl acrylate monomers with 0.5% (by weight) of Darocure ™ 1173 photoinitiator (Ciba Geigy Corp.; Ardsley, N.Y.) was poured onto the nickel mold. The backing material from Example 4 was pressed against the monomer mixture, with the oxygen-treated surface facing the monomers.

The mold/backing assembly was exposed to a mercury lamp (200 watts of electrical power over an area of 100 $cm^2$) for about 10 minutes. Once exposure was complete, the housing/backing unit was pried away from the nickel mold. A diamond-edged saw was used to cut the housing/backing unit into a 1 cm×4 cm rectangle.

Example 6: Assembling the Coupler

A polymeric substrate with one fiber-aligning groove at each end and a straight channel connection between the two grooves was placed on a metallic block with numerous holes drilled therein. By applying vacuum suction to the bottom of this block, the substrate was held tightly to thereto.

SMF-28 ™ optical fibers (Corning Inc.; Corning, N.Y.), which propagate a single mode at λ=1.3 μm, were prepared for insertion by cleaving. This provided a substantially flat end face. One of these cleaved fibers was placed into one of the fiber-aligning grooves of the substrate and held in place by a spring-loaded clip located a few millimeters from the edge of the substrate. The other fiber was similarly inserted and held.

A mixture of monomers and photoinitiator similar to that described in Example 5 [with 7% (by wt.) PcHA] was prepared. One drop of this was placed on the substrate and inserted fibers. This drop was sufficient to coat the substrate and to fill the channel and grooves.

A polymeric covering with fiber-aligning grooves in resgistry to those of the substrate was placed (groove side down) on the monomer-coated substrate. A glass slide was placed on top of the covering and pressed downward to squeeze out excess monomer and to fit the covering tightly around the fibers.

The glass slide was then secured with a pressure sensitive adhesive tape to the metal block. The secured coupler was exposed to a mercury lamp (same conditions as in Example 5) until the monomer mixture had cured. The PSA tape and the glass slide were removed from the coupler, and the coupler was removed from the metal block.

Example 7: Optical Coupling Efficiency

In a replicated straight channel polymeric substrate attached to a metal block (see Example 6) were inserted two fibers prepared as described in Example 6. The channel width of this substrate was 9 μm, and the width at the top of the V-shaped grooves was 157.5 μm. A drop of index-matching oil with $n_D$=1.56 (R. P. Cargill Laboratories, Inc.; Cedar Grove, N.J.) was placed on the substrate to act as a waveguiding medium.

A covering with corresponding fiber-aligning grooves was temporarily affixed, groove side up, on a transparent glass block by means of a drop of water. The covering/glass block combination was then inserted into a recessed hole in a metal plate, and the glass block was clamped to the metal plate. The covering/block/plate was inverted, placed above the substrate, and clamped so that the grooves in the cover were substantially aligned with those in the substrate.

The metal block to which the substrate was attached was then laterally positioned so as to optimize the alignment of the fiber grooves. After alignment was optimized (as viewed through a microscope), the metal block/substrate piece was translated upward until the substrate was compressed against the covering.

Light at a wavelength of 1.31 μm was launched into the end of one optical fiber. Measurement at the end of the fiber (prior to insertion into the substrate) showed 1.68 mW at the entrance to the waveguide channel. Output power was measured at the end of the opposite optical fiber. This number was ratioed against the input power to give a total insertion loss of 9.7 dB.

Although coupling conditions in this example were not optimized, some output power was observed. This shows that the couplers of the present invention can passively align input and output optical fibers.

Various modification and alterations which do not depart from the scope and spirit of this invention will become apparent to those skilled in the art. This invention is not to be unduly limited to the illustrative embodiments set forth herein.

We claim:

1. An integrated n×m optical coupler comprising a polymeric housing which is a unitary structure formed by joining a substrate and a covering which encloses
   (a) n input optical fibers,
   (b) n waveguide entry channels formed in at least one of said substrate and said covering, which divide or converge into m waveguide exit channels, also formed in at least one of said substrate and said covering, and (c) m output optical fibers, wherein n and m are, independently, integers between 1 and 1024 inclusive, each of said n waveguide entry channels being aligned to the core of the respective n input optical fibers and each of said m waveguide exit channels being aligned to the core of the respective m output optical fibers by means of precisely aligned grooves in said housing, said waveguide channels being filled by at least one polymerizable monomer which is capable of being cured to provide waveguiding cores.

2. The optical coupler of claim 1 wherein n is 1 and m is 2.

3. The optical coupler of claim 1 wherein said n input optical fibers and m output optical fibers support a single mode.

4. The optical coupler of claim 1 wherein said at least one monomer has been polymerized so as to form waveguiding cores.

5. The optical coupler of claim 4 wherein said n input optical fibers and m output optical fibers directly contact said waveguiding cores.

6. The optical coupler of claim 1 wherein the polymer of said polymeric housing is selected from the group consisting of epoxies, poly(meth)acrylates, poly(vinyl azlactones), poly(urethanes), and poly(ureas).

7. The optical coupler of claim 6 wherein said polymer comprises at least one of fluorine and deuterium atoms.

8. The optical coupler of claim 1 wherein said at least one monomer is selected from the group consisting of epoxy, (meth)acrylate, vinyl azlactone, urea, and urethane monomers, or precursors thereof, with the proviso that the refractive index of said at least one monomer, upon curing, is from 0.002 to 0.5 greater than the refractive index of the polymer of said polymeric housing.

9. The optical coupler of claim 8 wherein said at least one monomer comprises at least one of fluorine and deuterium atoms.

10. The optical coupler of claim 5 wherein said waveguiding cores have refractive indices substantially the same as that of the cores of said n and m optical fibers.

11. The optical coupler of claim 10 wherein said housing has a refractive index substantially the same as that of the cladding of said n and m optical fibers.

12. The optical coupler of claim 1 wherein a portion of said grooves tapers, from the exterior of said optical coupler toward the interior of said optical coupler, in at least one of the planar and vertical directions.

13. The optical coupler of claim 1 wherein said housing is attached to a backing.

14. The optical coupler of claim 13 wherein said backing is a polymer.

15. The optical coupler of claim 14 wherein said polymer backing has been treated with oxygen plasma to make said backing more adhesive to said optical coupler.

16. A polymeric housing for enclosing and prealigning optical fibers and channel waveguide cores comprising (a) a substrate comprising
(i) a first portion, one horizontal surface of which contains n grooves for holding n input optical fibers, (ii) a second portion, one horizontal surface of which contains n waveguide entry channels which divide or converge into m waveguide exit channels, and (iii) a third portion, one horizontal surface of which contains m grooves for holding m output optical fibers, and (b) a covering comprising
(i) a first portion, one horizontal surface of which contains n grooves for securing n input optical fibers, (ii) a second portion, one horizontal surface of which is substantially flat, and (iii) a third portion, one horizontal surface of which contains m grooves for securing m output optical fibers, wherein n and m are, independently, integers from 1 to 1024, said n grooves and m grooves being fashioned so that the cores of optical fibers to be held therein will be properly aligned with the ends of said corresponding waveguide channels, said substrate and covering being formed in such a way so that the two members can be adhesively joined together to form a housing which is substantially unitary.

17. The polymeric housing of claim 16 further comprising at least one monomer filling said waveguide channels and at least partially filling said grooves.

18. The polymeric housing of claim 17 wherein said monomer is selected from the group consisting of epoxy, meth(acrylate), vinyl azlactone, urea, and urethane monomers, or precursors thereof.

19. The polymeric housing of claim 18 wherein said monomer comprises at least one of fluorine and deuterium atoms.

20. The polymeric housing of claim 18 wherein said monomer further comprises colloidal silica.

21. The polymeric housing of claim 16 wherein n is 1 and m is 2.

22. The polymeric housing of claim 16 wherein said grooves have a depth of 50 to 500 $\mu$m.

23. The polymeric housing of claim 16 wherein said grooves have a depth of 60 to 200 $\mu$m.

24. The polymeric housing of claim 16 wherein said grooves have a depth of 62.5 $\mu$m.

25. The polymeric housing of claim 16 wherein said waveguide channels have widths and depths of 1 to 200 $\mu$m.

26. The polymeric housing of claim 25 wherein said waveguide channels have widths and depths of 5 to 100 $\mu$m.

27. The polymeric housing of claim 26 wherein said waveguide channels have widths and depths from about 5 $\mu$m to 8 $\mu$m.

28. The polymeric housing of claim 17 further comprising a means for collecting excess of said at least one monomer.

29. The polymeric housing of claim 16 wherein a portion of said n and m grooves in said substrate and covering tapers, from the exterior of said housing toward the interior of said housing, in at least one of the planar and vertical directions.

30. The polymeric housing of claim 16 wherein said horizontal surface of said second portion of said covering further contains n entry waveguide entry channels which divide or converge into m waveguide exit channels.

31. The polymeric housing of claim 30 wherein said substrate and said covering further comprise complementary means for fastening said substrate and said covering, said fastening means being designed so that, when engaged, said waveguide channels in said covering are aligned with said waveguide channels in said substrate.

32. An integrated optical coupler mold on which is formed the polymeric housing of claim 16.

33. The mold of claim 32 comprising nickel.

34. A master tool on which is electroplated the mold of claim 32.

35. The master tool of claim 34 comprising at least one of silicon, an oxide of silicon on silicon, and a polymer film on silicon.

36. A method for making a mold for the microreplication of polymeric integrated optical coupler housings comprising the steps:
   a) photolithographically etching a silicon wafer so as to form fiber-alignment grooves;
   b) coating said wafer with a photo-resist material;
   c) patterning in said photo-resist waveguiding channels which are aligned with said fiber-alignment grooves;
   d) electroplating said patterned wafer with a layer of a metal to provide a metallic complement to said wafer; and
   e) separating said metallic complement from said wafer.

37. A method of assembling an integrated optical coupler comprising the steps:
   a) inserting n input optical fibers and m output optical fibers into the respective n and m grooves in the substrate of the polymeric housing of claim 16;
   b) applying polymerizable monomer to the top surface of said substrate so as to surround said fibers and fill the waveguiding channels thereof and, upon polymerization, form waveguiding cores;
   c) placing the cover of said polymeric housing on said substrate and compressing the whole between flat plates so as to form the complete housing; and
   d) curing said housing.

38. A method of assembling an integrated optical coupler comprising the steps:
   a) applying polymerizable monomer to the top surface of the substrate of the polymeric housing of claim 16 so as to fill the waveguiding channels thereof and, upon polymerization, form waveguiding cores;
   b) inserting n input optical fibers and m output optical fibers into the respective n and m grooves in said substrate, said grooves being at least partially filled with said polymerizable monomer;
   c) placing the cover of said polymeric housing on said substrate and compressing the whole between flat plates so as to form the complete housing; and
   d) curing said housing.

39. The polymeric housing of claim 16 wherein said substrate and said covering further comprise complementary means for fastening said substrate and said covering, said fastening means being designed so that, when engaged, said covering and substrate are aligned in registry.

40. The optical coupler of claim 6 wherein the monomer mixture from which said polymer is formed further comprises colloidal silica.

* * * * *